United States Patent
Chovanec et al.

[11] 3,760,262
[45] Sept. 18, 1973

[54] ELECTROSTATIC SPARK IGNITION SENSITIVITY TEST APPARATUS AND METHOD

[75] Inventors: John J. Chovanec, Dover; Floyd J. Hildebrant, Andover, both of N.J.

[73] Assignee: The United States of America as represented by the Secretary of the Army, Washington, D.C.

[22] Filed: Feb. 28, 1972

[21] Appl. No.: 229,803

[52] U.S. Cl.......................... 324/32, 73/35, 73/167, 324/54
[51] Int. Cl........................... G01r 5/28, G01r 31/12
[58] Field of Search .................... 324/32, 54; 73/35, 73/167

[56] References Cited
UNITED STATES PATENTS

| | | | |
|---|---|---|---|
| 1,215,150 | 2/1917 | Hendricks, Jr. | 324/54 |
| 1,506,761 | 9/1924 | Macpherson | 324/54 |
| 1,565,721 | 12/1925 | Empson | 324/54 |

Primary Examiner—Rudolph V. Rolinec
Assistant Examiner—Ernest F. Karlsen
Attorney—Harry M. Saragovitz et al.

[57] ABSTRACT

A variable gap electrostatic spark ignition sensitivity test apparatus has a: cathode terminal for holding a test sample, an anode terminal in the form of a needle separated from the cathode terminal by an air gap, and a controllable movable arm which holds the anode terminal and moves it toward said cathode terminal and test sample, a capacitor disposed intermediate to and in electrical connection with both the anode terminal and cathode means terminal through a series limiting and viewing resistance, wherein the capacitor may be charged to a desired voltage by a power supply and further wherein an arc discharge will occur when the anode terminal is moved sufficiently close to the test sample held on said cathod terminal. The relative electrostatic spark ignition sensitivity of one test sample to another is measurable on an oscilloscope by measuring the peak current through a viewing resistor as a function of the relative discharge time through the respective test samples.

7 Claims, 2 Drawing Figures

Patented Sept. 18, 1973 3,760,262

3,760,262

ELECTROSTATIC SPARK IGNITION SENSITIVITY TEST APPARATUS AND METHOD

The invention described herein may be manufactured, used and licensed by or for the Government for governmental purposes without the payment to us of any royalty thereon.

BACKGROUND OF THE INVENTION

The present invention represents a response to a long-existent safety problem in those military arts wherein the use of an explosive, propellant or oxidizer is essential. In such use, a necessary requisite to safe handling and manufacture is that the electrostatic spark ignition sensitivity of the material be known. Electrostatic spark ignition sensitivity may be defined as the ease or ability of a combustible material to ignite or an explosive material to explode as the result of an electrostatic spark discharge passing through the material. Due to a plethora of variables that exist, the measurement of electrostatic spark ignition sensitivity has in the past proven to be particularly difficult.

The standard approach in the prior art is one known as the fixed gap discharge method. This method generally involves the placing of a test sample on one terminal of a set of fixed gap electrodes which are oppositely charged. In this arrangement the power generally is delivered through a switch to the electrodes which absorbs a considerable percentage of the power. Also, and most significantly, the fixed gap can never be relied upon to transmit the same amount of electricity during each discharge. This is due to the presence of several variables, foremost of which are (1) the changing resistance of the air in the air gap (the resistance is a function of humidity and barometric pressure) and (2) the variation of resistance of the test sample. Consequently, in the past it was difficult to compare the relative sensitivity of different materials since the conditions at the times of test discharge were variable.

SUMMARY OF THE INVENTION

An object of this invention is to provide a means of comparing the relative electrostatic spark ignition sensitivity of different materials.

Another object is to provide a method for measuring electrostatic spark ignition sensitivity wherein the accuracy of measurement will not be affected by varying conditions of relative humidity and barometric pressure.

Yet another object is to provide a means for obtaining a visual display of an electrostatic capacitor discharge current as a function of time through a combustible or explosive test sample.

The present invention relates to a method of measuring the electrostatic spark ignition sensitivity of a test sample which includes the steps of, mechanically directing a needle-pointed anode terminal at a fixed rate toward the test sample in electrical contact with a cathode terminal; charging a capacitance to a selectably choosable voltage level, wherein the positive terminal of the capaitance is electrically connected to the anode terminal needle and to the positive terminal of the power supply through a high voltage terminal, and the negative terminal of the capacitance is connected to circuit ground which is connected to the negative terminal of the power supply; adjustably moving the anode terminal toward the test sample until an electrostatic discharge occurs, and recording the wave form of the current pulse generated by the capacitor discharge across a series viewing resistor, which is electrically connected between circuit ground and the cathode terminal through variable limiting resistors, when the gap between the anode terminal and the test sample are broken down, by the spark discharge as indices of electrostatic spark ignition sensitivity.

DETAILED DESCRIPTION OF THE INVENTION

Figure 1:
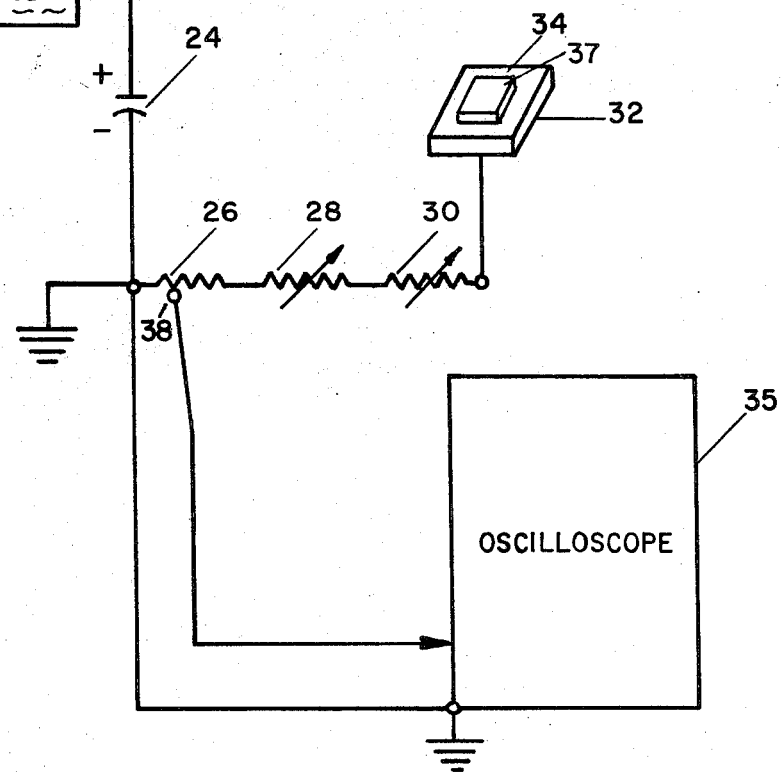
FIG. 1 is a schematic illustration of the present invention.

Referring now to FIG. 1, the electrostatic discharge spark ignition sensitivity apparatus comprises a movable lever arm 12 pivoted about a point 15 and restrained by a dashpot 16 which serves as a reglator movement means for the lever arm 12. The end 13 of the arm 12 fixedly holds thereon a needle 18 which serves as an anode terminal and electrode. A suitable needle is a chrome plated size 14 needle 18. The needle is connected to a power supply 20 through a high voltage terminal 22 and also connected to the positive terminal of the capacitor 24 through the electrical conductor 23 which is fixedly attached to the underneath side of the movable arm 12. The capacitor 24 is charged up to the test sample 34 test voltage through conductors 21 and 23 and the high voltage terminal 22.

In operation the electrical charge produced by the power source is stored in a capacitor 24 until a spark discharge occurs as a result of moving the needle 18 in the direction of the oppositely charged test sample 34. A suitable capacitor would be one capable of accepting a charge of up to 30,000 volts. This voltage level is not however to be taken as a maximum possible operative level.

Three series resistors 26, 28 and 30 serve as variable resistance means that influences both the voltage level within the sample and discharge time across the gap.

After the capacitor 24 is charged to the desired voltage, the arm 12 is lowered by pulling locking pin 14 which causes end 13 of movable arm 12 and needle 18 to tilt toward test sample 34 thereby opening up the high voltage terminal 22 and disconnecting the power supply 20 from the capacitor 24. A spark discharge will occur when the needle 18 and capacitor "see" a resistive path low enough for the charge on the capacitor to cause a spark which will jump the gap and penetrate the test sample 34. At a relative humidity of 40 percent and at standard temperature and pressure, the resistance a of 1 inch column of air is about 24 Megohms. The notable point in the gapping process is that in the instant variable-gap apparatus, every discharge from the same capacitor voltage will transfer almost exactly the same amount of energy to the test sample. This is because as the needle descends, gapping will always occur at the first instant at which the resistance of the air gap is low enough for the spark to ionize the air gap.

Disposed at the lower side of the spark gap is a cathode terminal or plate 32 on which the test sample 34 is held. A steel plate forms a suitable means for grounding. Surrounding the test sample 34 and positioned adjacent the plate 32 is a cardboard or rubber ring insulator 37 into which the test sample 34 is placed. The function of the insulator 37 is to prevent the spark from jumping around the sample to the cathode terminal and thence to ground.

The positively charged needle 18 and the arm 12 are held in place by the lock pin 14, which is removed by pulling a lanyard, thus allowing the needle 18 to separate from the high voltage terminal 22 and to controllably descend toward the test sample 34. The dashpot 16 prevents possible mechanical damage to the discharging needle 18. However, where sample ignition occurs, the needle 18 is replaced in order to insure uniform test conditions.

The usual test procedure is to successively increase the voltage level until the sample's lowest ignition point is reached. The resistances 26, 28 and 30 may be varied in order to test electrostatic spark ignition sensitivity of the specimen material at different rates of capacitance discharge. Suitable values for the resistances would be 5 kilohms, 50 kilohms and 150 kilohms. (Note that by increasing the discharge time, greater heating will occur within the sample). Also, it should be noted that a suitable value for the capacitor 24 would be 0.5 microfarads, but may be increased or decreased to simulate various types of spark discharge, e.g., human electrostatic spark discharge on combustible materials.

Figure 2:
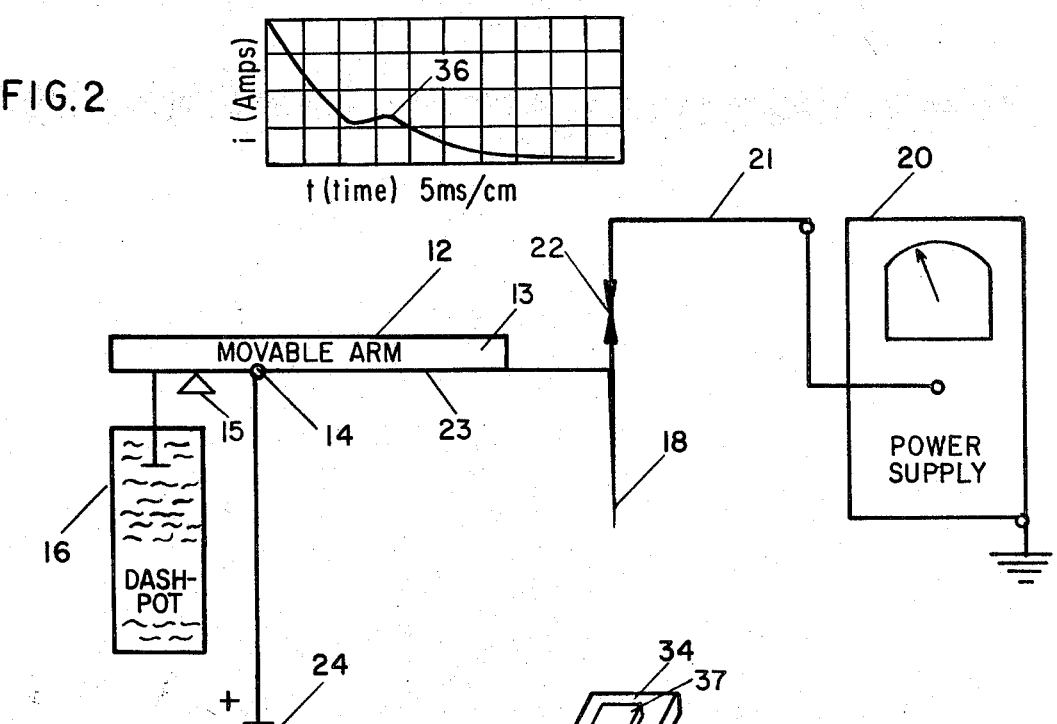
FIG. 2 is a graph showing a typical current waveform seen on the oscilloscope of the test circuit illustrated in FIG. 1 when the test sample has been subjected to an arc discharge and ignition has taken place.

In order to view the discharge as it passes through the test sample, an oscilloscope 35 is connected across a partion of the resistance 26 that is in the resistance current limiting circuit. The scope waveform, as illustrated in FIG. 2, shows both the magnitude of the discharge amperage ($i$) on the ordinate and its time of decay ($t$) plotted on the abscissa. On the waveform the instant test sample 34 ignition appears, as a small bump or discontinuity of shape 36. Distortion of the waveform may be minimized by connecting the scope lead 38 across a small portion of the particular non-inductive variable resistance (26 in the drawing) that is in the circuit. The exact fraction of the variable resistance that is used constitutes the largest resistance value that will not cause waveform distortion. One of these resistances is termed a non-inductive "viewing resistance". Its values can range from $10^{-4}$ to $10^{-2}$ of the total resistance.

For functional purposes the polarity of the anode and the cathode, may be interchanged.

It thus seen from the above that the objects set forth are among those made apparent from and efficiently attained by, the apparatus and method of the preceding description.

We wish it to be understood that we do not desired to be limited to the exact detail of construction shown and described for obvious modifications will occur to persons skilled in the art.

Having described our invention, what we claim as new, useful and non-obvious, and accordingly, by this instrument, secure by Letters Patent of the United States is:

1. A variable gap electrostatic spark ignition sensitivity test apparatus comprising:
   cathode means for holding a test sample;
   anode means, separated from said cathode means by an air gap, and pivotally and releasably suspended above said cathode means and controllably movable theretoward;
   a high voltage terminal electrically connected to said anode means for electrically connecting thereto and disconnecting therefrom a power supply;
   a capacitor having a positive terminal electrically connected to said anode means and to the positive terminal of said power supply through said high voltage terminal, and a negative terminal of said capacitor connected to circuit ground, which is connected to the negative terminal of said power supply;
   a variable resistance means electrically connected intermediate the negative terminal of said capacitor and said cathode means for controlling the current delivered to said test sample when said anode means is moved sufficiently close to said test sample as to cause said air gap to break down thereby discharging said capacitor, for regulating the rate of discharge of said capacitor through said test sample, and for monitoring the current pulse through said test sample as a function of time during said electrostatic spark ignition sensitivity testing; and
   visual display means electrically connected in parallel with a portion of said variable resistance means and said circuit ground for viewing and/or recording the waveform generated by the discharge of said capacitor through said air gap and said test sample.

2. The apparatus as recited in claim 1 in which said anode means comprises a needle-like member having its point directed toward the test sample.

3. The apparatus as recited in claim 2 wherein the visual display means comprises an oscilloscope electrically connected in parallel across a portion of said resistance means in order to display the discharge current and discharge time as the static charge of said capacitor passes through said test sample.

4. The apparatus as recited in claim 3 wherein said variable resistance means includes:
   a viewing resistor; and
   a variable resistor electrically connected in series with said viewing resistor wherein said viewing resistor has a resistance value taken as a fraction of said variable resistance means in the circuit, said fraction comprising a largest value of resistance that will not cause substantial distortion in the waveform, being viewed by said oscilloscope, said value ranging between $10^{-4}$ and $10^{-2}$ of the resistance being viewed, and wherein the use of said viewing resistor minimizes distortion in the waveform being viewed during the time of discharge.

5. The apparatus as recited in claim 4 in which said cathode means comprises a steel plate having an insulating sample-holding enclosure set therein.

6. A method of measuring the electrostatic spark ignition sensitivity of a test sample which comprises the steps of:
   directing a needle-pointed anode toward a cathode means;
   holding a test sample in electrical contact with said anode means;
   charging a capacitor intermediate to said cathode and anode to a specific voltage level, wherein the positive terminal of capacitance is electrically connected to the anode terminal needle and to the positive terminal of the power supply through a high voltage terminal, and the negative terminal of the capacitance is connected to circuit ground which is connected to the negative terminal of the power supply;

adjustably moving said anode toward said test sample until an electrostatic discharge occurs caused by the voltage breakdown of an air gap intermediate said anode and cathode means and spark ignition of said test sample; and measuring the waveform generated by said discharge across a portion of a viewing resistor in series with said cathode and said circuit ground point, so that said waveform can be used as an index of said test sample's electrostatic spark ignition sensitivity.

7. The method as recited in claim 6 which further comprises the step of selectably controlling the time period of said electrostatic discharge by the use of a variable resistance means inserted intermediate to, and in electrical connection with, said ground and said cathode means.

* * * * *